US012759450B2

(12) United States Patent
Vasquez

(10) Patent No.: US 12,759,450 B2
(45) Date of Patent: Oct. 13, 2026

(54) CAR SEAT NET ATTACHMENT

(71) Applicant: Stephanie Vasquez, Duncanville, TX (US)

(72) Inventor: Stephanie Vasquez, Duncanville, TX (US)

( * ) Notice: Subject to any disclaimer, the term of this patent is extended or adjusted under 35 U.S.C. 154(b) by 303 days.

(21) Appl. No.: 18/442,834

(22) Filed: Feb. 15, 2024

(65) Prior Publication Data

US 2025/0263001 A1 Aug. 21, 2025

(51) Int. Cl.
*B60N 3/00* (2006.01)
*B60R 11/00* (2006.01)

(52) U.S. Cl.
CPC ................ *B60N 3/00* (2013.01); *B60R 11/00* (2013.01); *B60R 2011/0015* (2013.01); *B60R 2011/0059* (2013.01)

(58) Field of Classification Search
CPC ............. B60R 7/043; B60R 2011/0063; B60R 2011/0075; B60R 2011/0012; B60R 2011/0082
See application file for complete search history.

(56) References Cited

U.S. PATENT DOCUMENTS

| | | | | | |
|---|---|---|---|---|---|
| 5,529,341 | A * | 6/1996 | Hartigan | B60R 21/06 | 5/118 |
| 5,690,355 | A * | 11/1997 | Kleinberg | B60P 3/38 | 280/730.1 |
| 6,089,659 | A * | 7/2000 | Toyota | A47C 31/11 | 297/229 |
| 6,648,410 | B2 * | 11/2003 | Sparks | B60N 2/6063 | 297/229 |
| 12,351,955 | B2 * | 7/2025 | Binder | D04B 1/16 | |
| 2002/0011505 | A1 * | 1/2002 | Cole | B60R 5/00 | 224/275 |
| 2015/0167707 | A1 * | 6/2015 | Hyers | F16M 11/041 | 29/446 |
| 2019/0283644 | A1 * | 9/2019 | Smith | B60N 3/102 | |
| 2021/0046880 | A1 * | 2/2021 | Gandhi | B60R 7/08 | |

* cited by examiner

*Primary Examiner* — Yanick A Akaragwe
(74) *Attorney, Agent, or Firm* — Lyman Moulton, Esq.; Moulton Patents, PLLC

(57) ABSTRACT

The Backseat Helper is the only product of its kind that is specifically developed to catch any and all items dropped by toddlers in a vehicle, in a primary net, to allow or a less stressful driving experience for both the parent and the child. This unprecedented product is uniquely designed with durable hooks that securely latch onto both the front seat and the child's car seat to guarantee the net is stable while driving and is easy to manage during utilization.

10 Claims, 1 Drawing Sheet

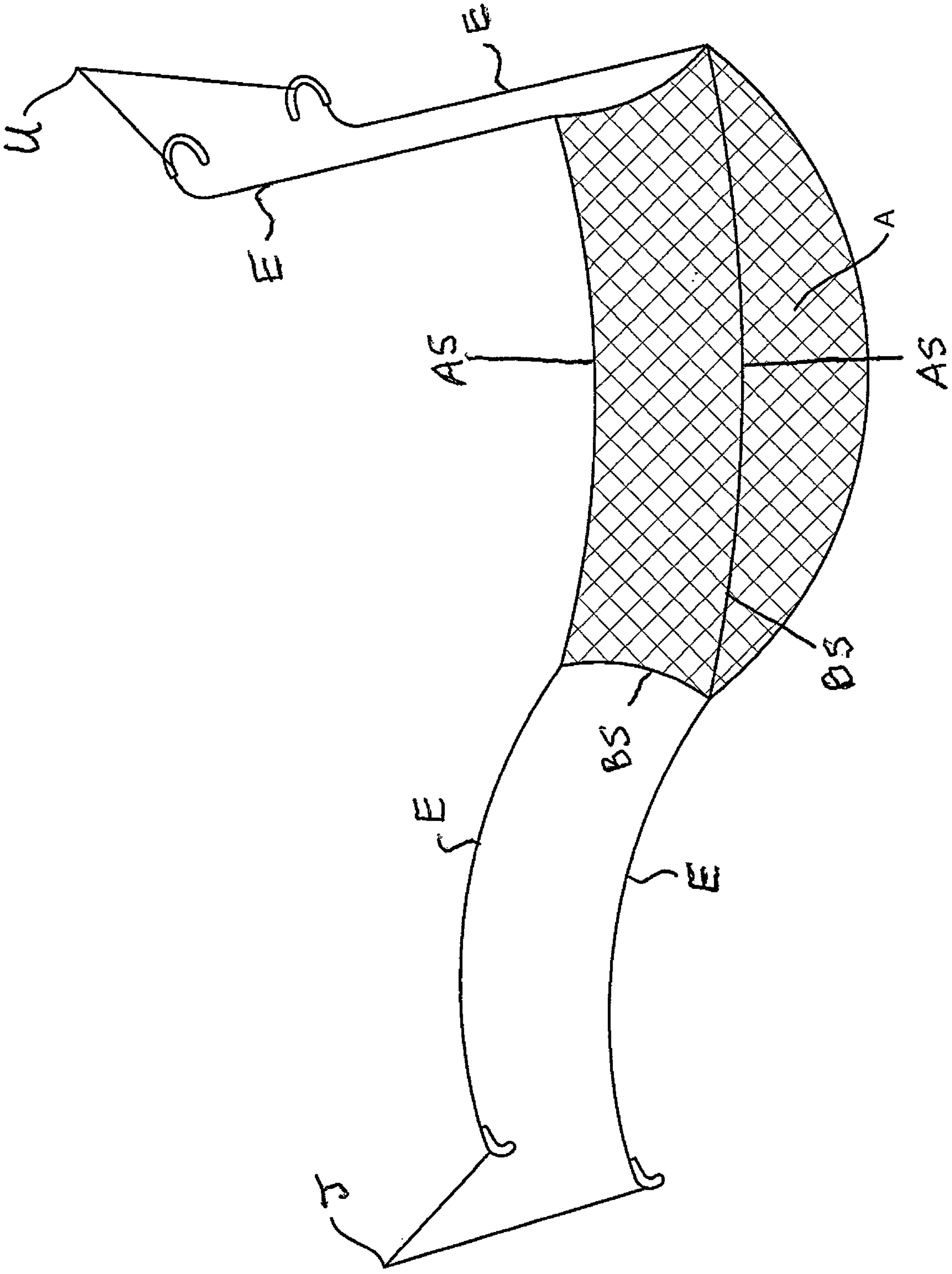
E
U
E
A
AS
AS
BS
BS
E
E
J

CAR SEAT NET ATTACHMENT

BACKGROUND

When it comes to keeping babies happy during transit in a car, the key is to keep their soothing items within reach, this may be pacifiers, books, electronic toys and/or a host of other items. Many babies, however, have the tendency of dropping such items in the car and then either crying or screaming hysterically, this is not only incredibly disruptive for the caretaker but it often requires the parent to turn around, diverting their attention from the road in order to find the lost toy, an action that increases the likelihood of collisions when operating a vehicle. There have been no products available as original equipment or as an aftermarket to address this problem.

An apparatus that keeps babies soothing items within reach preventing items that are dropped from being out of reach, keeping the child content, is not being met by any known device or system at present. There have been no products available as original equipment or as an aftermarket to address this problem either.

SUMMARY OF THE INVENTION

The main purpose of the car seat net attachment is to provide users with a net connected from a car seat to the front seat that catches anything a child drops to prevent the parent from having to turn around to retrieve the items.

The disclosed vehicle net includes longitudinal and latitudinal crisscross strings configured to form a net comprising a plurality of terminating corners and net voids, extension strings each disposed at one of the plurality of terminating corners on a first end and each comprising a second end and attachment each disposed at the second end of one of the plurality of extension strings.

BRIEF DESCRIPTION OF THE DRAWINGS

FIG. 1 is a perspective view of the car seat net with crisscross strings angular to extension strings in accordance with an embodiment of the present disclosure.

An embodiment of the car seat net with crisscross strings parallel with a border loop is disclosed in accordance with an embodiment of the present disclosure.

A further embodiment of a section of net coated with a synthetic foam material is configured to seal off net voids based on contact with a fluid in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a perspective view of the car seat net with crisscross strings angular to extension strings showing: net between back seat and front seat referenced as A, "J" hooks to attach to the base of toddler's car seat referenced as J, "C" hooks to attach to the back of the front seat referenced as U, border loop BS, extension strings E, and additional extension strings E in accordance with an embodiment of the present disclosure. The view also includes the assist strings AS, An embodiment of the car seat net includes crisscross strings parallel with a border loop in accordance with an embodiment of the present disclosure. The embodiment includes extension strings E, alligator clamps, spring closure clasps, longitudinal elastic fiber strings and latitudinal elastic fiber strings in accordance with an embodiment. The extension strings E also comprise elastic bungee cord extension strings. A coarse car seat net is made into a fine car seat net by folding over the car seat net along a longitudinal string or along a latitudinal string and using discrete attachments to secure the car seat net to the child car seat and to a back of a front driver and/or passenger car seat.

A further embodiment includes a section of net coated with a synthetic foam material configured to seal off net voids based on contact with a fluid in accordance with an embodiment of the present disclosure. The embodiment includes the synthetic coated strings, the net voids and extension strings both before and after contact with a fluid which causes closure of the net voids to seal off the net voids and prevent a penetration of the fluid through the net A.

The present disclosed car seat net, also known as "Backseat Helper," offers a modern placement for dropped items to be easily retrieved without requiring parents to take their eyes off the road; thus, allowing for a safer and overall improved driving experience, at all times. Meant to complement the initial design of the front and back seat of an average vehicle, the Backseat Helper introduces a novel net that securely attaches to the base of the toddler's car seat and the back of the front seat. In the case that the toddler drops their toy, the net will catch the toy or item to ensure it does not get lost or stuck underneath any part of the vehicle which thereby provides quick accessibility to those items for the caretaker to return it to the toddler/child without having to divert their attention from the road as they drive. This innovative, top-quality product ensures a fully operational car accessory that may benefit all parents dealing with a toddler in the back seat.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A vehicle net comprising:

a plurality of longitudinal and latitudinal crisscross strings configured to form a net comprising a plurality of terminating corners and net voids, wherein each of the crisscross strings is coated with a synthetic sponge material configured to expand upon contact with a fluid and fill the net voids;

a plurality of extension strings each disposed at one of the plurality of terminating corners on a first end and each comprising a second end; and a plurality of attachments each disposed at the second end of one of the plurality of extension strings.

2. The vehicle net of claim 1, further comprising a border string running a complete loop adjoining the plurality of terminating corners.

3. The vehicle net of claim 2, wherein the plurality of crisscross strings run angularly to the border string.

4. The vehicle net of claim 2, wherein the plurality of crisscross strings run parallel to the border string.

5. The vehicle net of claim 1, further comprising additional extension strings and additional attachments disposed intermediate to the plurality of terminating corners.

6. The vehicle net of claim 1, further comprising elastic fibers in the longitudinal strings.

7. The vehicle net of claim 1, further comprising elastic fibers in the latitudinal strings.

8. The vehicle net of claim 1, further comprising elastic fibers in the latitudinal strings and in the latitudinal strings.

9. The vehicle net of claim 1, wherein the plurality of attachments include "J" hooks bent backward at an angle.

10. The vehicle net of claim 1, wherein the plurality of attachments include "U" hooks.

* * * * *